United States Patent [19]

Simonton et al.

[11] 4,381,596
[45] May 3, 1983

[54] METHOD AND APPARATUS FOR BATTERY PLATE STACKING

[75] Inventors: Robert D. Simonton, Fremont; Carl D. Schultz, Tiffin, both of Ohio

[73] Assignee: Mac Engineering & Equip. Co., Inc., Benton Harbor, Mich.

[21] Appl. No.: 231,003

[22] Filed: Feb. 4, 1981

[51] Int. Cl.$^3$ .................. H01M 10/14; B65G 47/28; B65G 47/91
[52] U.S. Cl. ........................... 29/623.1; 29/730; 198/421; 198/449; 414/41; 414/73; 414/121; 271/5; 271/9; 271/94
[58] Field of Search ............... 29/730, 623.1, 623.2; 198/421, 449; 414/41, 73, 121, 124; 271/4, 5, 6, 9, 94, 96

[56] References Cited

U.S. PATENT DOCUMENTS

| | | | |
|---|---|---|---|
| 2,704,593 | 3/1955 | Galloway | 29/730 |
| 2,897,950 | 8/1959 | Reed | 29/730 |
| 2,908,377 | 10/1959 | Winkel et al. | 29/730 |
| 2,930,476 | 3/1960 | Andrews | 198/421 |
| 3,978,571 | 9/1976 | Orlando et al. | 29/730 |

Primary Examiner—Francis S. Husar
Assistant Examiner—Jonathan L. Scherer
Attorney, Agent, or Firm—Michael, Best & Friedrich

[57] ABSTRACT

An apparatus for alternately stacking finite numbers of n positive battery plates and n+1 negative battery plates wherein a negative battery plate is provided at both the top and bottom ends of the stack. The apparatus includes a moving conveyor belt on which the positive plates are deposited having a spacing interval greater than the length of two negative plates. A negative plate is dropped onto the conveyor belt in the space between the positive plates and, in order to provide a negative plate at both the top and bottom ends of a resulting stack, two negative plates are dropped into the space between the positive plates whenever the required number of positive plates for a stack have been deposited on the conveyor belt. The negative and positive plates are then sequentially removed from the conveyor belt and dropped on top of each other thus producing a stack of alternating negative and positive plates, with a negative plate at both the bottom and top of the stack.

7 Claims, 4 Drawing Figures

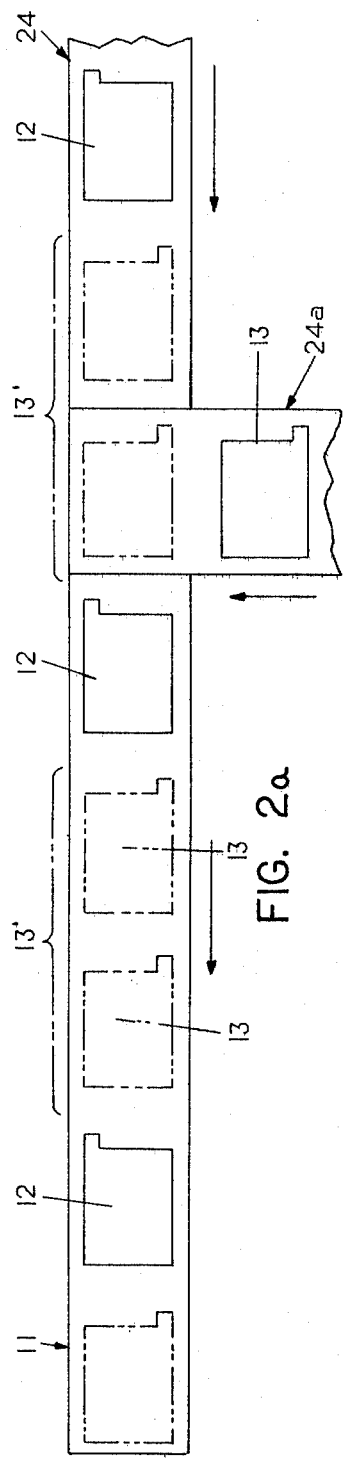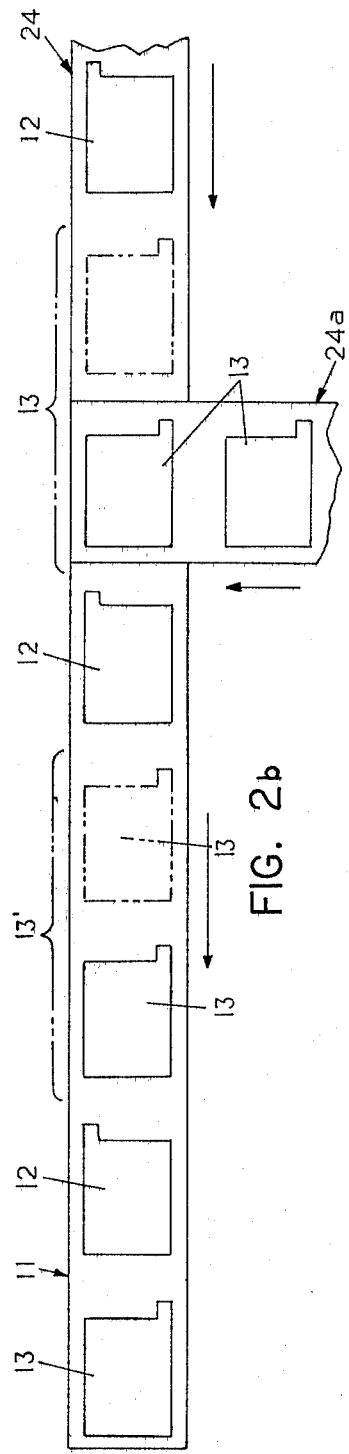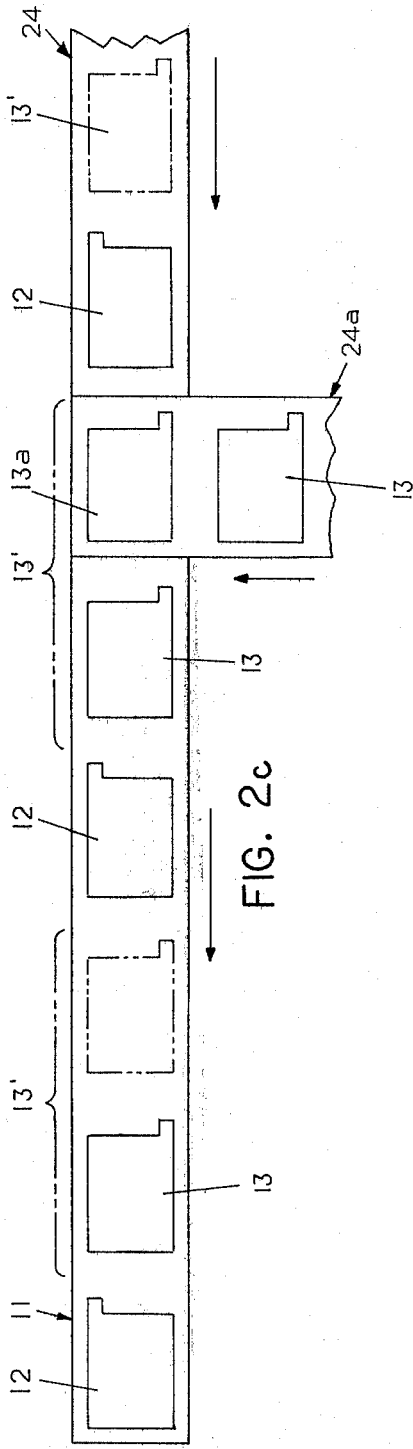

METHOD AND APPARATUS FOR BATTERY PLATE STACKING

BACKGROUND OF THE INVENTION

1. Field of the Invention

This invention generally relates to a method and apparatus for stacking plate-like articles and more particularly to a method and apparatus for alternately stacking finite numbers of at least two different types of plate-like articles.

2. Description of the Prior Art

While the instant invention has features which make it applicable for many purposes in various fields, the present disclosure is directed particularly to the handling of wrapped battery plates used in manufacturing lead-acid batteries. As is well known, present day automotive and industrial batteries are made up of a number of cells wherein each cell includes a plurality of alternately arranged positive and negative plates. The positive cells are wrapped in a micro-porous plastic envelope. Normally each cell is produced by an operator manually assembling a finite number of alternating plates into a stack for insertion into each cell chamber of a battery casing. Such a repetitive manual operation is tedious and boresome and an operator may inadvertently place a positive plate next to a positive plate and/or a negative plate next to a negative plate. This of course produces defective batteries and prohibitive production losses as such batteries are expensive to repair and/or scrap. Accordingly, it is highly desirable to automate this manual process.

SUMMARY OF THE INVENTION

Briefly the apparatus constructed in accordance with the invention produces a stack of alternately arranged positive and negative battery plates wherein the stack has a negative plate at both the top and bottom ends of the stack. Generally the apparatus includes an endless belt conveyor wherein a first transfer device successively deposits positive plates on the moving belt of such conveyor at a spacing interval equal to the length of two negative plates. A second transfer device drops a negative battery plate onto the moving belt of the conveyor in the space provided between the positive battery plates. In order to provide a negative battery plate at both the top and bottom ends of the resulting stack, two negative plates are dropped into the space provided between the positive plates whenever the required number of positive battery plates for a cell have been deposited on the conveyor belt. The positive and negative plates are then sequentially removed from the conveyor belt by a stacking conveyor which deposits the plates on a take-off conveyor as a stack of alternating positive and negative battery plates, wherein a negative plate is at both at the top and bottom ends of the resulting stack.

OBJECTS AND ADVANTAGES

An object of this invention is to provide a process for alternately stacking finite numbers of positive and negative battery plates with a negative plate at the top and bottom of the stack.

Another object of this invention is to provide a process for alternately arranging positive and negative battery plates on a conveyor belt and then stacking them in a group of required number with a negative plate at the top and bottom ends of each stack.

Other objects and advantages will become more apparent during the course of the following description when taken in connection with the accompanying drawings.

BRIEF DESCRIPTION OF THE DRAWINGS

In the drawings wherein like numerals are employed to designate like parts throughout the same:

FIGS. 2a, 2b and 2c are schematic diagrams of positive and negative battery plates on a conveyor resulting in stack of alternately arranged battery plates.

DESCRIPTION OF THE PREFERRED EMBODIMENTS

Figure 1:
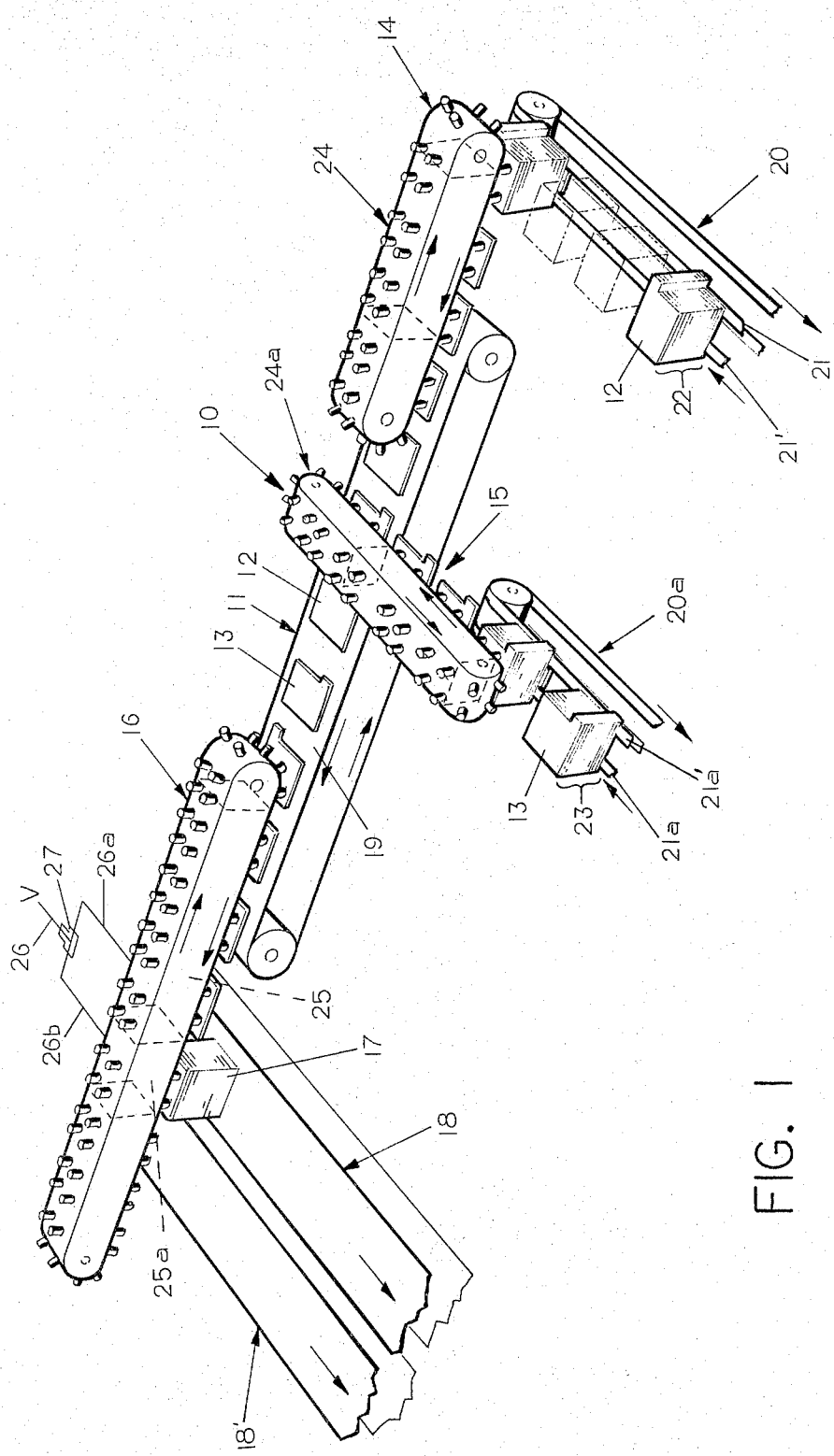
FIG. 1 is a perspective view of an apparatus for alternately arranging and sequentially stacking positive and negative battery plates.

Referring now to FIG. 1 there is illustrated an apparatus designated in its entirety by the reference numeral 10 which alternately arranges individual positive and negative battery plates in a line and then successively picks them up to subsequently stack them in a vertical group having a negative plate at both the top and bottom ends of the stacked vertical group.

Briefly, the apparatus 10 includes an elongated belt conveyor 11 on which positive and negative battery plates 12 and 13 respectively are aligned; a pair of transfer devices 14 and 15 located at one end of the conveyor 11 for respectively depositing positive and negative battery plates thereon in an alternating order, and a stacking conveyor 16 located at the other end of the conveyor 11 for successively picking up the alternately arranged battery plates 12 and 13 and depositing them in a vertical stack 17 on a take-off conveyor 18.

More specifically, the elongated conveyor 11 is a conventional conveyor having an endless belt 19 onto which the battery plates 12 and 13 are dropped in alternate relationship. The endless belt 19 is moved in the direction of the arrows by conventional drive means (not shown).

The transfer devices 14 and 15 are of the type disclosed in copending U.S. patent application Ser. No. 231,379 filed concurrently herewith and assigned to the assignee of this application.

Each transfer device 14 and 15, respectively, includes a conveyor 20 and 20a having a pair of spaced apart parallel endless flights 21—21' and 21a—21a' for moving vertical stacks 22 and 23 of positive and negative battery plates 12 and 13, respectively, beneath an endless belt suction conveyor 24 and 24a having a portion overlying the belt 19 of the conveyor 11. As disclosed in the aforementioned patent application Ser. No. 231,379, each suction conveyor 24 and 24a is adapted to pick up the top battery plate from their respective stack 22 and 23 of plates 12 and 13 and drop them individually onto the belt 19 of the conveyor 11.

Referring now to FIG. 2a, the stack 22 of positive plates 12 is moved into a position beneath the suction conveyor 24 by the conveyor 20 where the top plate of the stack 22 is sequentially picked up by the conveyor 24 and deposited on the belt 19 at a spacing interval 13' at least equal to the length of two negative plates 13. As is conventional each positive plate is wrapped in an envelope of micro-porous plastic material (not shown). As schematically illustrated therein, the movement of the suction conveyor 24 is synchronized with the movement of the belt conveyor 11 to deposit a positive plate 12 (shown in full lines) on the belt 19 with the desired interval spacing 13' (shown in dot-dash lines) greater than the length of two negative plates 13. It should be noted that the battery plates may be deposited on the conveyor belt 19 in a position 90° from that shown in the drawings. Accordingly, the spacing between two positive plates would be greater than the width of two negatives plates instead of their length.

Referring now to FIG. 1, the stack 23 of negative battery plates 13 is moved into a position beneath the suction conveyor 24a by the conveyor 20a. The top plate of the stack 23 is sequentially picked up by the conveyor 24a and deposited on the belt 19 in one half of the space 13' provided between the positive plates 12 (see FIG. 2b). As schematically illustrated in FIG. 2b, the operation of the transfer device 15 is synchronized with the movement of the belt conveyor 11 to deposit a negative plate 13 (shown in full lines) in one-half of the space interval 13' (the other half being shown in dot-dash lines).

In order to produce the vertical stack 17 comprised of n positive and n +1 negative plates in alternating order with a negative plate 13 positioned at both the top and bottom ends of the stack 17, the movements of the conveyor 11 and the suction conveyor 24a are coordinated to allow the conveyor 24a to periodically speed up and deposit a second negative plate 13a (shown in full lines in FIG. 2c) in the other half of the space interval 13' (shown in dot-dash lines in FIGS. 2a and 2b). Suitably arranged, conventional electrical control devices (not shown) are provided for coordinating the operation of the various conveyors which are driven by conventional drive members (not shown). Since these elements are not part of the instant invention, further discussion thereof is not deemed necessary.

Referring now to FIG. 1, the stacking conveyor 16 is a suction conveyor whose construction and operation is similar to the conveyors 24 and 24a. The main difference between these conveyors is that the conveyor 16 is provided with a pair of suction chambers 25 and 25a while the conveyors 24 and 24a only have one suction chamber. In this instance the suction chambers 25 and 25a of the conveyor 16 are connected to a common source of vacuum V by a conduit line 26 having branch lines 26a and 26b. The branch lines may be connected together by a valve 27 wherein the chamber 25 and 25a may be combined to constitute an elongated chamber, the purpose of which will be described hereinafter. It should be noted that the vertical stack 17 of alternating plates 12 and 13 is formed by the conveyor 16 successively lifting the prearranged plates from the moving belt 19 of the conveyor 11 and depositing the plates on each other on the normally stationary conveyor 18. In order to continuously produce stacks of battery plates of finite numbers, a second take-off conveyor 18' is provided beneath the stacking conveyor 16 adjacent the vacuum chamber 25a. Thus, when the predetermined number of battery plates of one stack have been dropped on the conveyor 18, the suction chamber 25a is combined with the suction chamber 25 so that the conveyor 16 carries and drops the battery plates 12 and 13 onto the conveyor 18'. In this manner the conveyor 18 and 18' may be alternately moved so that stacks 17 of battery plates are continuously produced. For example, after a stack 17 of battery plate is dropped on the conveyor 18, the conveyor 16 is controlled to drop a stack of battery plates on the conveyor 18' and the conveyor 18 is advanced to a position to receive another stack 17 of battery plates, and vice-versa.

It is to be understood that the form of the invention herewith shown and described is to be taken as an illustrative embodiment only of the same and that various procedural changes may be resorted to without departing from the spirit of the invention.

What is claimed:

1. A method for forming a vertical stack of n positive and n+1 negative battery plates in alternating order with a negative plate positioned on both the bottom and top of the stack, said method comprising the steps of depositing a series of positive plates on a horizontally moving elongated belt in spaced relation to one another and with a spacing longitudinally of the belt between successive positive plates at least equal to two negative plates, depositing a series of negative plates on the belt such that one negative plate of the series of negative plates is deposited between each successive pair of positive plates with each negative plate being located between and in spaced relation longitudinally of the belt to the positive plates in each successive pair, and depositing an additional negative plate on the belt between each pair of positive plates which comprise the last plate of one group of n positive plates and the first plate of the next group of n positive plates, and so that the additional negative plate is located between and in spaced relation longitudinally of the belt to one negative plate and one positive plate.

2. A method in accordance with claim 1 and further including the step of successively and individually lifting each of the plates from the belt and successively and individually depositing the plates on one another to form a stack.

3. A method of assembling a vertical stack of n positive and n+1 negative battery plates in alternating order with a negative plate positioned on both the bottom and top of the stack comprising the steps of depositing positive and negative plates in alternating order and in longitudinally spaced relation to one another on a moving path, additionally depositing on the path, after n number of positive plates have been deposited on the path, an additional negative plate located in longitudinally spaced relation to a negative plate and to a positive plate, and successively individually lifting the plates from the path and depositing the plates on one another to form a stack.

4. A method of assembling a vertical stack of n positive and n+1 negative plates in accordance with claim 3 and additionally including the step of successively individually removing each stack of plates.

5. A method of assembling a vertical stack of n positive and n+1 negative plates in accordance with claim 3 or claim 4 wherein the path moves horizontally, wherein the positive plates are deposited on the path with a longitudinal spacing between successive positive plates at least equal to two negative plates, wherein a single negative plate is deposited on the path between each of n positive plates, and wherein two negative plates are deposited on the path after the last positive plate of each group of n positive plates and ahead of the first positive plate of the next group of n positive plates.

6. Apparatus for forming a vertical stack of n positive and n+1 negative battery plates in alternating order with a negative plate positioned on both the bottom and top of the stack comprising a conveyor including a horizontally moving elongated belt, means for depositing a series of positive plates on said belt in spaced relation to one another and with a spacing longitudinally of said belt between successive positive plates at least equal to two negative plates, means for depositing a series of negative plates on said belt such that one negative plate of said series of negative plates is deposited between each successive pair of positive plates with each negative plate being located between and in spaced relation longitudinally of said belt to said positive plates in each successive pair, and means for depositing an additional negative plate on said belt between each pair of positive plates which comprise the last plate of one group of n positive plates and the first plate of the next group of n positive plates, and so that said additional negative plate is located between and in spaced relation longitudinally of said belt to one negative plate and one positive plate.

7. Apparatus in accordance with claim 6 and further including means for successively individually lifting each of the plates from said belt and successively and individually depositing the plates on one another to form a stack.

* * * * *